United States Patent
Nuzman et al.

(10) Patent No.: US 10,312,966 B2
(45) Date of Patent: Jun. 4, 2019

(54) METHODS AND SYSTEMS FOR REDUCING CROSSTALK FOR SETS OF LINES

(71) Applicants: Carl J. Nuzman, Union, NJ (US); Paschalis Tsiaflakis, Schriek (BE)

(72) Inventors: Carl J. Nuzman, Union, NJ (US); Paschalis Tsiaflakis, Schriek (BE)

(73) Assignees: NOKIA OF AMERICA CORPORATION, Murray Hill, NJ (US); ALCATEL LUCENT, Boulogne-Billancourt (FR)

( * ) Notice: Subject to any disclaimer, the term of this patent is extended or adjusted under 35 U.S.C. 154(b) by 891 days.

(21) Appl. No.: 14/575,942

(22) Filed: Dec. 18, 2014

(65) Prior Publication Data
US 2016/0182122 A1    Jun. 23, 2016

(51) Int. Cl.
*H04B 3/32* (2006.01)
*H04M 3/00* (2006.01)

(52) U.S. Cl.
CPC .............. *H04B 3/32* (2013.01); *H04M 3/007* (2013.01)

(58) Field of Classification Search
CPC ................................ H04B 3/32; H04M 3/007
USPC ................................................. 370/431–546
See application file for complete search history.

(56) References Cited

U.S. PATENT DOCUMENTS

| 2012/0195183 A1* | 8/2012 | Nuzman | H04B 7/0848 370/201 |
| 2013/0215951 A1* | 8/2013 | Nuzman | H04B 3/32 375/227 |
| 2014/0254791 A1* | 9/2014 | Wei | H04M 11/062 379/406.01 |
| 2016/0164621 A1 | 6/2016 | Tsiaflakis et al. | |

OTHER PUBLICATIONS

"Self-FEXT cancellation (vectoring) for use with VDSL2 transceivers," Series G: Transmission Systems and Media, Digital Systems and Networks, ITU G.993.5, Apr. 2010.

* cited by examiner

*Primary Examiner* — Pao Sinkantarakorn
*Assistant Examiner* — Kabir U Jahangir
(74) *Attorney, Agent, or Firm* — Harness, Dickey & Pierce, P.L.C.

(57) ABSTRACT

At least one example embodiment discloses a method including determining a first set of lines and a second set of lines in a system, obtaining signals to be transmitted over, or received from, the first set of lines and the second set of lines, obtaining normal operation interval (NOI) vectoring coefficients for the second set of lines, determining discontinuous operation interval (DOI) vectoring coefficients for the first set of lines, the DOI vectoring coefficients for the first set of lines and the NOI vectoring coefficients for the second set of lines being part of a vectoring matrix and jointly processing the signals for a discontinuous operation interval using the vectoring matrix.

23 Claims, 7 Drawing Sheets

METHODS AND SYSTEMS FOR REDUCING CROSSTALK FOR SETS OF LINES

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

G.vector uses mutually orthogonal pilots and correlation as described in "Self-FEXT cancellation (vectoring) for use with VDSL2 transceivers," *Series G: Transmission Systems and Media, Digital Systems and Networks, ITU* G.993.5, April 2010, the entire contents of which is incorporated by reference.

In the context of providing data network access to homes and businesses, various technologies collectively known as FTTx have been used or proposed. In these technologies, data is conveyed from a network operator to an intermediate location using fiber optics, and data is conveyed from the intermediate location to the customer location using DSL transmission over twisted pair copper lines. The term FTTdp refers to a scenario in which the intermediate location is a "distribution point", serving up to a few dozen customers within a distance of less than 200 m. For example, G.fast is a transmission technology that uses time division duplexing (TDD) to duplex downstream and upstream transmission.

SUMMARY

At least one example embodiment discloses a method including determining a first set of lines and a second set of lines in a system, obtaining signals to be transmitted over, or received from, the first set of lines and the second set of lines, obtaining normal operation interval (NOI) vectoring coefficients for the second set of lines, determining discontinuous operation interval (DOI) vectoring coefficients for the first set of lines, the DOI vectoring coefficients for the first set of lines and the NOI vectoring coefficients for the second set of lines being part of a vectoring matrix and jointly processing the signals for a discontinuous operation interval using the vectoring matrix.

In an example embodiment, the vectoring matrix includes a $|B|\times(|B|+|A|)$ submatrix for the discontinuous operation interval, where $|B|$ is a number of the first set of lines corresponding to the DOI vectoring coefficients and $|A|$ is a number of the second set of lines corresponding to the NOI vectoring coefficients. In an example embodiment, the method further includes storing the $|B|\times(|B|+|A|)$ submatrix in a memory storage medium.

In an example embodiment, the first set of lines is associated with a higher vectoring performance than the second set of lines.

In an example embodiment, the determining determines the first and second sets of lines based on at least one of a traffic load of the system and static data rate values associated with the lines in the first and second sets of lines, respectively.

In an example embodiment, the NOI vectoring coefficients and the DOI vectoring coefficients are precoder coefficients and the vectoring matrix is a precoding matrix.

In an example embodiment, the NOI vectoring coefficients and the DOI vectoring coefficients are postcoder coefficients and the vectoring matrix is a postcoding matrix.

In an example embodiment, the postcoding matrix includes a $(|B|+|A|)\times|B|$ submatrix for the discontinuous operation interval, where $|B|$ is a number of the first set of lines corresponding to the DOI postcoder coefficients and $|A|$ is a number of the second set of lines corresponding to the NOI postcoder coefficients.

In an example embodiment, the method further includes storing the $(|B|+|A|)\times|B|$ submatrix in a memory storage medium.

At least one example embodiment discloses a method including determining a first set of lines and a second set of lines in a system, obtaining signals to be transmitted over, or received from, the first set of lines and the second set of lines, determining a first vectoring matrix for the first set of lines and the second set of lines, the first vectoring matrix including an identity matrix and a $|B|\times|B|$ inverse channel matrix, where $|B|$ is a number of the first set of lines, determining a second vectoring matrix, the second vectoring matrix including normal operation interval (NOI) vectoring coefficients associated with the first set of lines and the second set of lines and an identity matrix and jointly processing the signals for a discontinuous operation interval by sequentially applying the first matrix and the second matrix.

In an example embodiment, the jointly processing jointly processes the signals by sequentially applying the second matrix followed by the first matrix.

In an example embodiment, the jointly processing jointly processes the signals by sequentially applying the first matrix followed by the second matrix.

In an example embodiment, the first set of lines is associated with a higher vectoring performance than the second set of lines.

At least one example embodiment discloses an access node including a processor configured to determine a first set of lines and a second set of lines in a system, obtain signals to be transmitted over, or received from, the first set of lines and the second set of lines, obtain normal operation interval (NOI) vectoring coefficients for the second set of lines, determine discontinuous operation interval (DOI) vectoring coefficients for the first set of lines, the DOI vectoring coefficients for the first set of lines and the NOI vectoring coefficients for the second set of lines being part of a vectoring matrix and jointly process the signals for a discontinuous operation interval using the vectoring matrix.

In an example embodiment, the vectoring matrix includes a $|B|\times(|B|+|A|)$ submatrix for the discontinuous operation interval, where $|B|$ is a number of the first set of lines corresponding to the DOI vectoring coefficients and $|A|$ is a number of the second set of lines corresponding to the NOI vectoring coefficients.

In an example embodiment, the processor is configured to store the $|B|\times(|B|+|A|)$ submatrix in a memory storage medium.

In an example embodiment, the first set of lines is associated with a higher vectoring performance than the second set of lines.

In an example embodiment, the processor is configured to determine the first and second sets of lines based on at least one of a traffic load of the system and static data rate values associated with the lines in the first and second sets of lines, respectively.

In an example embodiment, the NOI vectoring coefficients and the DOI vectoring coefficients are precoder coefficients and the vectoring matrix is a precoding matrix.

In an example embodiment, the NOI vectoring coefficients and the DOI vectoring coefficients are postcoder coefficients and the vectoring matrix is a postcoding matrix.

In an example embodiment, the postcoding matrix includes a $(|B|+|A|)\times|B|$ submatrix for the discontinuous operation interval, where $|B|$ is a number of the first set of lines corresponding to the DOI postcoder coefficients and $|A|$ is a number of the second set of lines corresponding to the NOI postcoder coefficients.

In an example embodiment, the processor is configured to store the $(|B|+|A|)\times|B|$ submatrix in a memory storage medium.

At least one example embodiment discloses an access node including a processor configured to determine a first set of lines and a second set of lines in a system, obtain signals to be transmitted over, or received from, the first set of lines and the second set of lines, determine a first vectoring matrix for the first set of lines and the second set of lines, the first vectoring matrix including an identity matrix and a $|B|\times|B|$ inverse channel matrix, where $|B|$ is a number of the first set of lines, determine a second vectoring matrix, the second vectoring matrix including normal operation interval (NOI) vectoring coefficients associated with the first set of lines and the second set of lines and an identity matrix and jointly process the signals for a discontinuous operation interval by sequentially applying the first matrix and the second matrix.

In an example embodiment, the processor is configured to jointly process the signals by sequentially applying the second matrix followed by the first matrix.

In an example embodiment, the processor is configured to jointly process the signals by sequentially applying the first matrix followed by the second matrix.

BRIEF DESCRIPTION OF THE DRAWINGS

Example embodiments will become more appreciable through the description of the drawings, which are not limiting of example embodiments, in which.

DETAILED DESCRIPTION OF EXAMPLE EMBODIMENTS

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be implemented over the twisted pair section of an FTTdp network, but are not limited thereto.

Both postcoding and precoding operations will be described. The terms "joint-processing" and "vectoring" cover both precoding and postcoding operations.

G.fast is a transmission technology that uses time division duplexing (TDD) to duplex downstream and upstream transmission. TDD frames are used as data units, where each TDD frame consists of a separate downstream and upstream time interval. Each interval on its own is further divided into a normal operation interval (NOI) during which all lines are allowed to transmit data (typically vectored), and a discontinuous operation interval (DOI) during which only a subset of lines are allowed to transmit data, while the remaining lines are discontinued (quiet). Thus, discontinuing lines reduces power consumption of the system.

Discontinuous vectoring refers to applying vectoring to the active lines in DOI. A symbol in NOI can in principle be a data symbol or an idle symbol. In DOI, a line that is scheduled for transmission can transmit a data symbol, an idle symbol or a quiet symbol. However, a line that is not scheduled for transmission in DOI, should be a quiet symbol.

Switching subsets of lines in G.fast employs time division duplexing for dynamic resource allocation (DRA). Switching OFF refers to switching a part of the analog front end and/or digital logic to a reduced power consumption level.

Two classes of conventional discontinuous vectoring schemes can be approximate methods and exact methods. The approximate methods work with relatively low complexity but also with relative poor SNR performance whereas exact methods achieve high SNR performance but have high implementation complexity.

Two approximate methods are a virtual precoder input method (VPI) method and a muted vectoring (MV) method. When using VPI and MV, the only way to obtain ideal data rate performance for a given interval of time is to turn off DOI and use NOI exclusively for that period of time.

A block time division multiple access (TDMA) computes multiple DOI precoder blocks, but only one DOI precoder block is active at a time. In block TDMA, a certain number of subsets of lines are chosen in advance, and DOI precoder blocks are computed for each subset.

In operation, a DRA module selects which subset is to be active during each time slot. For the block TDMA scheme to ensure full vectoring data rate performance for a premium set of lines at all times, each subset includes the set of premium lines. In this way, the premium lines can be active in each time slot if needed, and achieve ideal SNR performance. However, a relatively large amount of memory is used to store the precoder coefficients associated with each subset.

For a system with N lines and considering n block DOI precoders of sizes $M_1, M_2, \ldots, M_n$ (with $M_i >= |B|$, for all i), this requires an additional DOI memory of $M_1 \times M_1 + M_2 \times M_2 + \ldots + M_n \times M_n$, next to the already provisioned NOI memory, where $|B|$ is the number of premium lines. On the computational side, matrix inverses are updated whenever the subsets change. For example, to remove a line from a subset with $M_i$ lines, updating the precoder matrix uses about $M_i^2$ operations. To add a line to an existing subset, updating the precoder matrix uses about 6 $M_i^2$ operations.

To solve/reduce these issues, example embodiments disclose a discontinuous blocking vectoring scheme with different service users at a full vectoring data rate.

More specifically, example embodiments provide full vectoring data rate performance for at least a subset of lines at all moments, even when using discontinuous vectoring to save power consumption. For example, a subset of lines is subscribed to some premium service subscription for which full vectoring data rate performance is used at all moments, even when using discontinuous mode (for the other lines) to save power. In another example, long lines may already have a small data rate and one wants to prevent further reduction of these data rates when using discontinuous vectoring.

Figure 1:
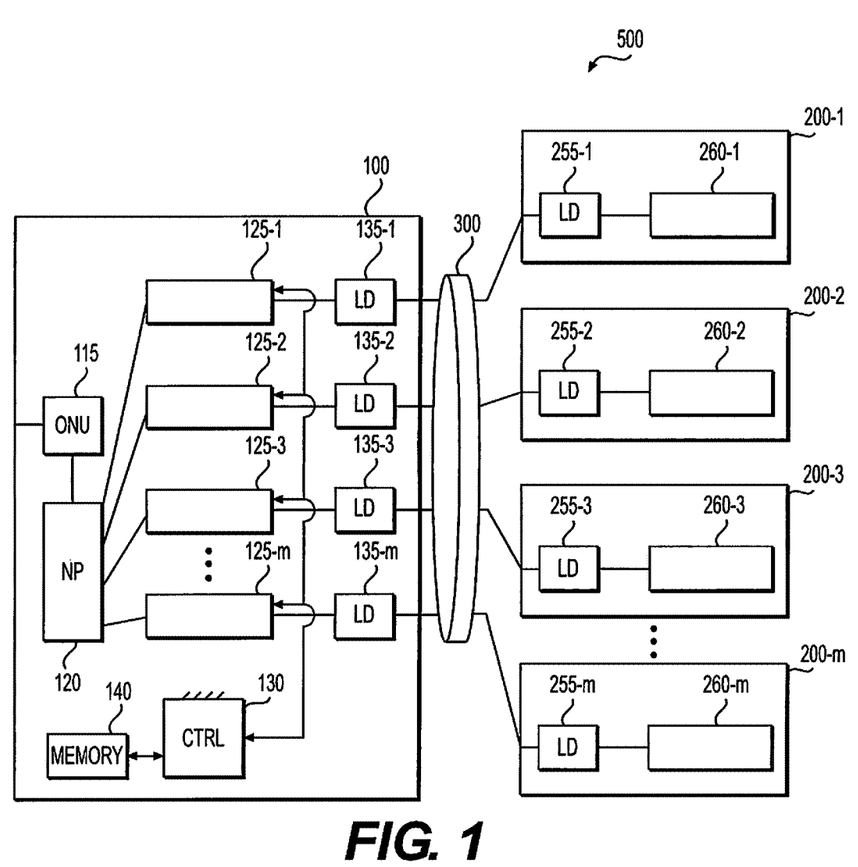
FIG. 1 illustrates a communication network according to an example embodiment.

FIG. 1 illustrates a communication system according to an example embodiment. As shown in FIG. 1, the system 500 includes a distribution point or access node 100 and Customer Premises Equipment (CPEs) 200-1 to 200-m, where m may be an integer greater than 1.

The access node 100 may be under control of an operator. The access node 100 includes an optical network unit (ONU) 115 configured to communicate with a network processor (NP) 120. As is known, the ONU 115 provides a high-bandwidth data connection over a fiber optic channel to an optical line terminal (OLT) located in a central office. The ONU 115 passes received downstream data frames or packets to the NP 120, which then determines the destination for the frames or packets and accordingly forwards them to an appropriate interface (e.g., DSL, ADSL, G.fast, etc. interface). Similarly, in the upstream direction, the NP 120 forwards frames or packets from the interfaces to the ONU 115.

The NP 120 provides signals to processing devices 125-1 to 125-m. The processing devices 125 are configured for point-to-point communication.

The access node 100 further includes a controller 130. The controller 130 is configured to receive signal data collectively referred to as a signal vector from the processing devices 125. The signal data may include signal values intended to be received by corresponding processing devices 260-1 to 260-m in the CPEs 200. In the downstream direction, the controller 130 is also configured to precode the signal vector, and send the resulting data back to the processing devices 125 for transmission to the CPEs 200. The processing devices 125 then send the precoded signal data over respective lines 300 via respective analog front ends (AFEs) 135-1 to 135-m. In the upstream direction, the processing devices 125 receive crosstalk-contaminated signals from the AFEs 135. The controller 130 receives the crosstalk-contaminated signals (collectively referred to as received signal vector) from the processing devices 125, postcodes the received signal vector, and provides the processing devices 125 with the post-compensated signal data. The processing devices 125 then continue to process the signal data to demodulate the intended upstream information.

Generally, the data exchanged between processing devices would be frequency-domain samples, but alternatively the data could be represented as time-domain samples, for example.

As discussed above, the controller 130 communicates with the processing devices 125. Alternatively, the controller 130 may be between the processing devices 125 and the respective AFEs 135-1 to 135-m. Thus, the location of the controller 130 is not limited to the location shown in FIG. 1.

Furthermore, it will be understood that the access node 100 may include a memory 140, or multiple memories. The NP 120, the controller 130, and/or the processing devices 125 execute programs and/or program modules stored on the memory 140 to perform their respective functions and the functions of the access node 100. The operation of the access node 100 will be described in greater detail below with respect to some example embodiments. The memories may be external to and/or internal to the NP 120, the controller 130, and/or the processing devices 125. For the purposes of simplicity of illustration only, only the memory 140 associated with the controller 130 is shown.

As discussed above, each of the processing devices 125 may communicate with a respective one of the CPEs 200 over the communication lines 300 through an associated AFE 135. The lines 300 (also referred to as links) may be telephone lines (e.g., twisted copper pairs), and the CPEs 200-1 to 200-m may be modems or other interface devices operating according to a communication standard for transmitting data over telephone lines. The CPEs 200-1 to 200-m may be located in various customer premises. Each of the CPEs 200-1 to 200-m includes an AFE 255-1 to 255-m and respective processing devices 260-1 to 260-m. Each of the AFEs 255-1 to 255-m may be the same or substantially the same as the AFEs 135-1 to 135-m.

Figure 2:
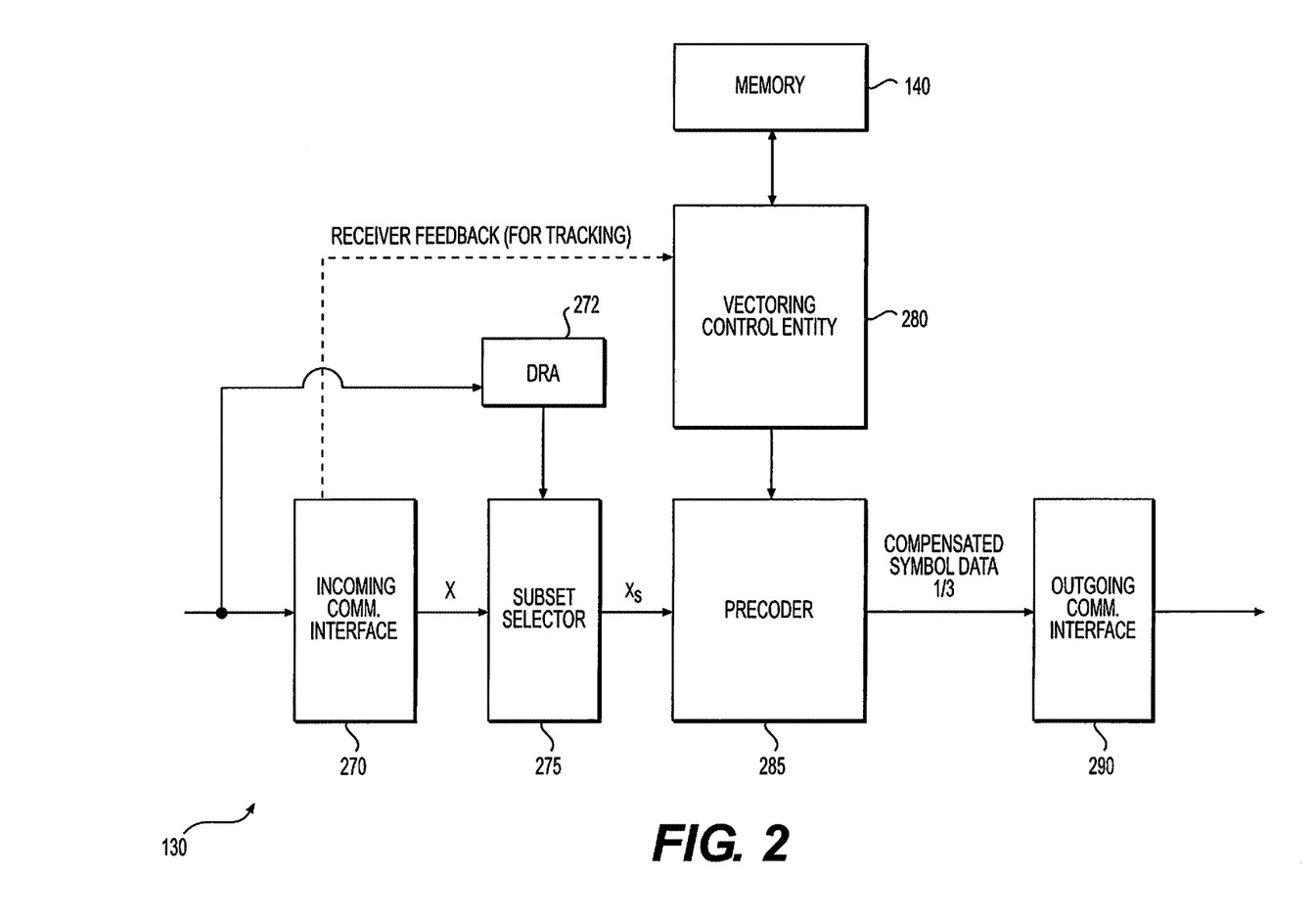
FIG. 2 illustrates a portion of a controller including a precoder according to an example embodiment.

FIG. 2 illustrates a portion of the controller 130 including a precoder according to an example embodiment. The controller 130 has a communication interface 270 with each of the processing devices 125-1 to 125-m. The incoming communication interface 270 receives data and control signals from the processing devices 125-1 to 125-m. The incoming communication interface 270 forwards symbol data x to the subset selector 275.

The processing devices 125-1 to 125-m may maintain individual queues containing packets of information to be sent on each of the N lines. At any point in time, some queues may have packets waiting to be sent, while other queues are empty. A dynamic resource allocation (DRA) module 272 collects information about the queues from the processing devices 125-1 to 125-m. The DRA module 272 then determines which subset of lines is to be active in each time slot. The DRA module 272 determines which subset of lines is to be active in each time slot using any known algorithm.

The DRA module 272 notifies the subset selector 275 of the subset of lines that will transmit physical layer signals (active lines) and a subset of lines that will not send physical layer signals (discontinued lines) during a DMT slot t. The active lines may or may not have data to send. An active line without data to send is called an idle line; in a vectored system, all active idle lines send compensation signals generated by the precoder 285, regardless of whether they have data to send. The incoming communication interface 270 designates the active lines for transmission during a selected time slot.

The incoming communication interface 270 also forwards receiver feedback, such as crosstalk characteristics to the subset selector 275 and to a vectoring control entity (VCE) 280.

The crosstalk characteristics could be error feedback samples or DFT output samples collected by the receiver, as described in the G.fast recommendation (the samples are then processed by correlation etc. to come up with estimates of crosstalk coefficients). Alternatively, the crosstalk characteristics could be estimates of crosstalk coefficients, computed elsewhere and then forwarded to the VCE. Additionally, the crosstalk characteristics could be other forms of feedback, e.g., SNR measurements, that are affected by crosstalk and can be used to learn something about the crosstalk.

The subset selector 275 forwards symbol data $x_s$ corresponding to the subset of active lines to a precoder 285.

The precoder 285 applies coefficients received from the VCE 280 to the symbol data received from the subset selector 275 to produce compensated data symbols $y_s$ (precoded data), which are forwarded to an outgoing communication interface 290. The outgoing communication interface 290 sends the compensated data symbols to the processing devices 125-1 to 125-m. Additionally, the incoming communication interface 270 periodically receives receiver feedback data, which it forwards to the VCE 280.

In FIG. 2, the incoming communication interface 270, the subset selector 275, the precoder 285 and the outgoing communication interface 290 may be considered data path elements while the DRA module 272 and the vectoring control entity 280 may be considered control path elements that instruct the data path elements what to do.

Each of the incoming communication interface 270, the subset selector 275, the precoder 285, the outgoing communication interface 290, the DRA module 272 and the vectoring control entity 280 may be implemented in hardware, a processor configured to execute software, firmware, or any combination thereof, for example. When at least one of the incoming communication interface 270, the subset selector 275, the precoder 285, the outgoing communication interface 290, the DRA module 272 and the vectoring control entity 280 is hardware, such existing hardware may include one or more Central Processing Units (CPUs), digital signal processors (DSPs), application-specific-integrated-circuits (ASICs), field programmable gate arrays (FPGAs) or the like configured as special purpose machines to perform the functions of the at least one of the incoming communication interface 270, the subset selector 275, the precoder 285, the outgoing communication interface 290, the DRA module 272 and the vectoring control entity 280. CPUs, DSPs, ASICs and FPGAs may generally be referred to as processors and/or microprocessors.

In the event where at least one of the incoming communication interface 270, the subset selector 275, the precoder 285, the outgoing communication interface 290, the DRA module 272 and the vectoring control entity 280 is a processor executing software, the processor is configured as a special purpose machine to execute the software, stored in a storage medium (e.g., memory 140), to perform the functions of the at least one of the incoming communication interface 270, the subset selector 275, the precoder 285, the outgoing communication interface 290, the DRA module 272 and the vectoring control entity 280. In such an embodiment, the processor may include one or more Central Processing Units (CPUs), digital signal processors (DSPs), application-specific-integrated-circuits (ASICs), field programmable gate arrays (FPGAs) computers.

At least some example embodiments disclose a discontinuous vectoring method (pre- or postcoder) where a premium set of lines B are dedicated for full vectoring data rate performance during their symbol transmissions. The set of lines B can be static or the controller 130 may vary the set of lines B over time (e.g., periodically or dynamically) depending on the traffic load or on operator/system requirements (e.g., minimum data rates associated with the lines). The minimum data rates may be static values and may be associated with a service of the user. For example, a premium service line would have a higher associated minimum data rate than a line not associated with the premium service. In another example, the minimum data rate may be based on the length of the line.

A non-premium set of lines that can be active (with a better than non-vectoring performance) or discontinued to save power. The non-premium set of lines can be static or the controller 130 may vary the non-premium set of lines over time (e.g., periodically or dynamically) depending on the traffic load or on operator/system requirements (e.g., minimum data rates associated with the lines).

Based on estimated channel information and an NOI pre-/postcoder (already available in memory as it is used for vectored NOI operation), one or more DOI pre-/postcoders are generated for discontinuous vectoring obtaining full vectoring data rate performance for the premium set of lines. In addition, the non-premium set of lines that are active have a better than non-vectoring performance during DOI. Some of the non-premium set of lines can be discontinued in DOI (to save power).

Example embodiments save memory by re-using NOI pre-/postcoder coefficients for the non-premium lines in DOI. In this approach, DOI-specific coefficients are stored for the premium lines and not the non-premium lines.

For example, a precoder/postcoder for a system of N lines, with DOI block sizes $M_1, M_2, \ldots, M_n$, only requires DOI memory of total size $|B| \times (M_1 + \ldots + M_n)$, compared with the memory size $M_1^2 + \ldots + M_n^2$ required for Block TDMA.

Downstream—Block Boosting

In at least some example embodiments, the controller 130 implements block boosting for the downstream (precoder).

A (normalized) channel is given by G (with the channel system model H=diag(H)G, where diag(H) refers to the diagonal matrix containing the diagonal elements of H). The controller 130 determines the channel G using any known method such as sending pilot symbols to the CPEs 200-1 to 200-m and receiving error feedback from the CPEs 200-1 to 200-m.

The controller 130 determines the set of lines B to be the premium set of lines. As stated above, the set of lines B can be static or can change dynamically over time depending on, e.g., the variation of the traffic load or operator/system requirements. The controller 130 then determines subsets of non-premium lines $A_k$, which are subblocks of lines that can be simultaneously active with the premium set of lines B. The entire block is denoted $M_k = B \cup A_k$.

The controller 130 may determine the subsets of non-premium lines $A_k$ in various ways to group the subsets of non-premium lines $A_k$ according to minimum data rates associated with the lines and/or traffic load.

For example, there may be 32 lines, and 4 lines are premium lines, in the set B. The controller 130 may define $A_1$ as the top 4 non-premium lines in terms of traffic load, and overlapping set $A_2$ as the top 12 non-premium lines in terms of traffic load. Then, the controller 130 uses the NOI (all 32 lines active) for enough symbols to meet the needs of the lines not in $A_2$. The controller 130 will then have set $M_2=B \cup A_2$ (16 lines) active for enough symbols to meet any additional needs of lines in $A_2$ but not in $A_1$. The controller 130 will then have set $M_1=B \cup A_1$ (8 lines) active for enough symbols to meet any additional needs of lines in $A_1$ but not in B. Finally, the controller 130 will then set $M_0=B$ (4 lines) active for enough symbols to meet any additional needs of the premium lines B.

The sets $A_k$ could also be modified by the controller 130 to take into account crosstalk coupling strength, as described in U.S. application Ser. No. 14/562,197, filed on Dec. 5, 2014, the entire contents of which are hereby incorporated by reference. For example, a line that would not a priori be in $A_2$ because it has a low traffic level could be added to $A_2$ because it has a strong coupling with other lines in $A_2$, and including it will improve the rate of other lines when $M_2$ is active.

For each subblock $A_k$, the full channel G and a precoder matrix $P_{Down}$ can be written as follows:

$$G = \begin{bmatrix} G_{DD} & G_{DA_k} & G_{DB} \\ G_{A_k D} & G_{A_k A_k} & G_{A_k B} \\ G_{BD} & G_{BA_k} & G_{BB} \end{bmatrix}$$

$$P_{Down} = \begin{bmatrix} P_{Down\ DD} & P_{Down\ DA_k} & P_{Down\ DB} \\ P_{Down\ A_k D} & P_{Down\ A_k A_k} & P_{Down\ A_k B} \\ P_{Down\ BD} & P_{Down\ BA_k} & P_{Down\ BB} \end{bmatrix},$$

where D is a set of discontinued lines, $A_k$ is the set of non-premium lines in subblock k, and B is the set of premium lines. A zero-forcing precoder (without discontinued lines) satisfies:

$$GP_{Down}=I$$

The subscript "Down" is used to identify a matrix used to remove crosstalk on the downstream. Moreover, while a zero-forcing precoder is discussed, it should be understood that precoders other than a zero-forcing precoder may be used.

With block boosting, the controller 130 uses the following precoder coefficients in DOI when the set of lines $\{A_k, B\}$ are active:

$$\begin{bmatrix} P_{Down\ A_k A_k} & P_{Down\ A_k B} \\ G_{BB}^{-1} G_{BA_k} P_{Down\ A_k A_k} & G_{BB}^{-1}(I - G_{BA_k} P_{Down\ A_k B}) \end{bmatrix},$$

The coefficients $P_{DownAkAk}$ and $P_{DownAkB}$ are used for vectoring the non-premium lines in the subblock $A_k$ and are the same coefficients used in NOI in the downstream. Therefore, the coefficients $P_{DownAkAk}$ and $P_{DownAkB}$ do not require any additional memory because they are already stored in the memory 140 for NOI in the downstream. Using the coefficients $P_{DownAkAk}$ and $P_{DownAkB}$ results in a partially vectored rate for lines in subblock $A_k$.

The remaining coefficients $G_{BB}^{-1} G_{BA_k} P_{Down\ A_k A_k}$ and $G_{BB}^{-1}(I-G_{BA_k} P_{Down\ A_k B})$ are specific to subblock $A_k$ and are computed by the controller 130 to ensure that the lines in the set of lines B achieve full signal-to-noise ratio (SNR) performance. The VCE 280 determines coefficients $G_{BB}^{-1} G_{BA_k} P_{Down\ A_k A_k}$ and $G_{BB}^{-1}(I-G_{BA_k} P_{Down\ A_k B})$ using knowledge of G (estimated and stored in the VCE 280) and of $P_{Down}$ (a copy of which is also stored in the VCE 280).

In particular, during DOI using the combination $\{A_k, B\}$, the resulting channel after precoding is $$GP_{Down}[k] = \begin{bmatrix} G_{DD} & G_{DA_k} & G_{DB} \\ G_{A_k D} & G_{A_k A_k} & G_{A_k B} \\ G_{BD} & G_{BA_k} & G_{BB} \end{bmatrix}$$

$$\begin{bmatrix} 0 & 0 & 0 \\ 0 & P_{Down\ A_k A_k} & P_{Down\ A_k B} \\ 0 & -G_{BB}^{-1} G_{BA_k} P_{Down\ A_k A_k} & G_{BB}^{-1}(I - G_{BA_k} P_{Down\ A_k B}) \end{bmatrix}$$

$$= \begin{bmatrix} 0 & G_{DA_k} + X_2 & G_{DB} + X_2 \\ 0 & I + X_2 & X_2 \\ 0 & 0 & I \end{bmatrix}$$

where $X_2$ is a matrix subblock indicating second order crosstalk terms (e.g., terms generated from the product of off-diagonal crosstalk elements) and D represents a set of lines that are not active during the specified DOI interval, i.e., the set of lines not in B or $A_k$.

There are no residual $X_2$ terms in the rows corresponding to the set of premium lines B. As a result, the set of premium lines B get full vectored performance. The presence of the residual $X_2$ terms in the rows corresponding to the set of lines $A_k$ means that the set of lines $A_k$ get "partially vectored" performance (better than non-vectored), with first crosstalk terms removed, but second-order terms remaining.

As described, the controller 130 may perform at least two tasks. First, the controller 130 (e.g., the VCE 280) determines the subblocks $\{B,A_1\}, \{B,A_2\}, \ldots, \{B,A_n\}$ for which the controller 130 will store precoding coefficients in the memory 140. This includes determining how many subblocks and which lines to include in the subblocks. The controller 130 may determine the subblocks based on traffic load estimations/requirements (over a longer period), which may be updated. For example, the controller 130 determines the subblocks to achieve a desired energy-throughput objective trade-off.

Second, the controller 130 determines which subblocks to apply during which symbols in the DOI. The controller 130 may determine which subblocks to apply during which symbols in the DOI based on instantaneous traffic load requirements, where the schedule is updated at a typically much faster pace than the subblock determination.

The following description illustrates how memory is saved. $P_{Down}[-1]$ is an NOI precoder and $P_{Down}[k]$ is a precoder in use when $\{B,A_k\}$ is active. $P_{Down}[0]$ is a precoder in use when the subset B is active. Since $$P_{DownAkAk}[k]=P_{DownAkAk}[-1], \text{ and}$$

$$P_{DownAkB}[k]=P_{DownAkB}[-1],$$

the controller 130 and the memory 140 do not use any additional storage beyond Down $P_{Down}[-1]$ for the $P_{DownAkAk}[k]$ and $P_{DownAkB}[k]$ submatrices of $P_{Down}[k]$.

The controller 130 (e.g., the VCE 280) computes and stores $$P_{DownBAk}[k]=G_{BB}^{-1}G_{BA_k}P_{DownA_kA_k}[-1], \text{ and}$$

$$P_{DownBB}[k]=G_{BB}^{-1}(I-G_{BA_k}P_{DownA_kB}[-1])$$

which are $|B|\times|A_k|$ and $|B|\times|B|$ matrices, respectively. By contrast, for block TDMA, the controller 130 would have to store the entire $(|B|+|A_k|)\times(|B|+|A_k|)$ matrix $P_{Down}[k]$.

The controller 130 may store the $|B|\times|B|$ matrix $$P_{DownBB}[0]=G_{BB}^{-1}$$

for when only the premium lines B are active.

Consequently, while matrix inverses of size $(|A_k|+|B|)\times(|A_k|+|B|)$ must be computed for block TDMA, the controller 130 only has to compute a $|B|\times|B|$ matrix inverse $(G_{BB}^{-1})$ when implementing block boosting for the downstream.

Figure 3A:
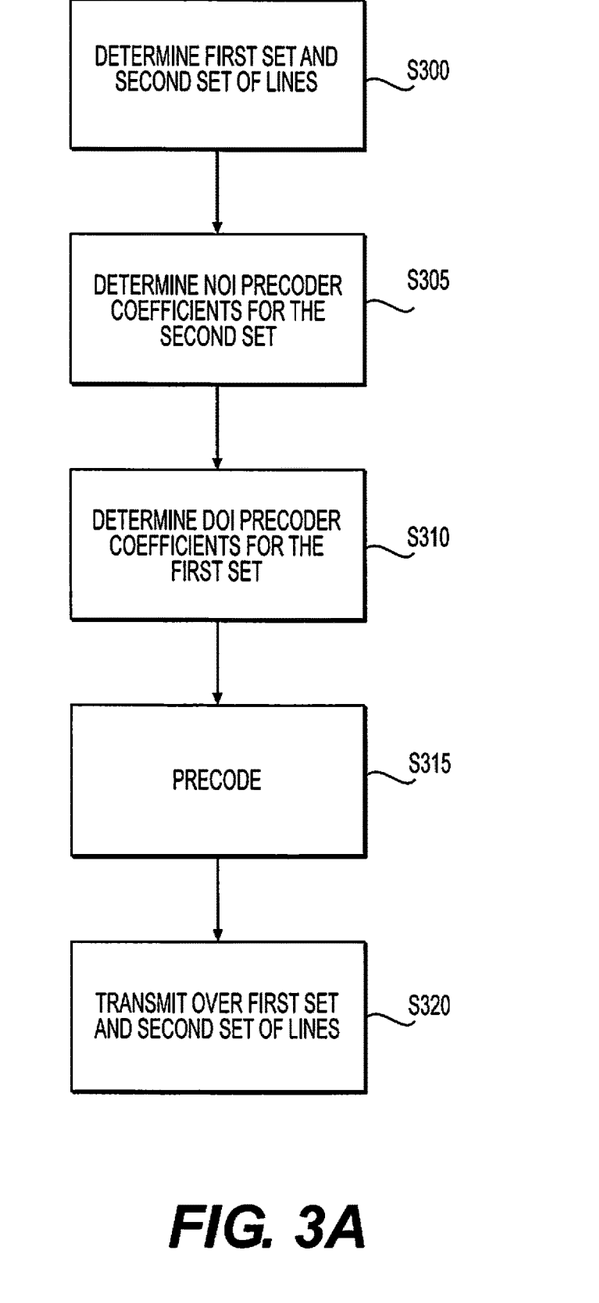
FIG. 3A illustrates a method of transmitting using block boosting on a downstream according to an example embodiment.

FIG. 3A illustrates a method of transmitting using block boosting on the downstream. The method of FIG. 3A may be performed by the access node 100. More specifically, the controller 130 may perform steps S300-S315.

At S300, the access node determines a first set of lines and a second set of lines. The first set of lines may be the set of lines B and the second set of lines may be the set of lines $A_k$.

At S305, the controller 130 obtains NOI precoder coefficients for the second set of lines. For example, the controller 130 obtains the coefficients $P_{DownAkAk}[-1]$ and $P_{DownAkB}[-1]$ used in NOI for the downstream from the memory 140.

At S310, the controller 130 determines DOI precoder coefficients for the first set of lines. The DOI precoder coefficients for the first set of lines and the NOI precoder coefficients for the second set of lines form part of a precoding matrix.

At S315, the controller 130 precodes a signal for a discontinuous operation interval using the precoding matrix. At S320, the access node 100 transmits over the first and second sets of lines based on the precoded signal.

Downstream—Sequential Boosting

As an alternative to block boosting, the controller 130 may implement sequential boosting for the downstream (precoder), in at least some example embodiments.

When using sequential boosting for the downstream, the controller 130 sequentially applies two sparse matrices as follows:

$$\begin{bmatrix} 0 & 0 & 0 \\ 0 & I & 0 \\ -G_{BB}^{-1}G_{BD} & -G_{BB}^{-1}G_{BA} & G_{BB}^{-1} \end{bmatrix} \begin{bmatrix} 0 & 0 & 0 \\ 0 & P_{Down\,AA} & P_{Down\,AB} \\ 0 & 0 & I \end{bmatrix},$$

where A refers to active non-premium lines, B to the premium lines and I denotes an identity matrix.

The controller 130 may not identify the subblock A in advance, but any lines outside the premium set of lines B can discontinue at any time slot. The remaining non-premium lines that are not discontinued may constitute the subblock A. The computations performed by the controller 130 are sequential, meaning that the results of the first matrix multiplication (matrix with the $P_{Down}$ terms) must be calculated and available before beginning the second matrix multiplication (the matrix with the G and $G^{-1}$ terms).

Figure 3B:
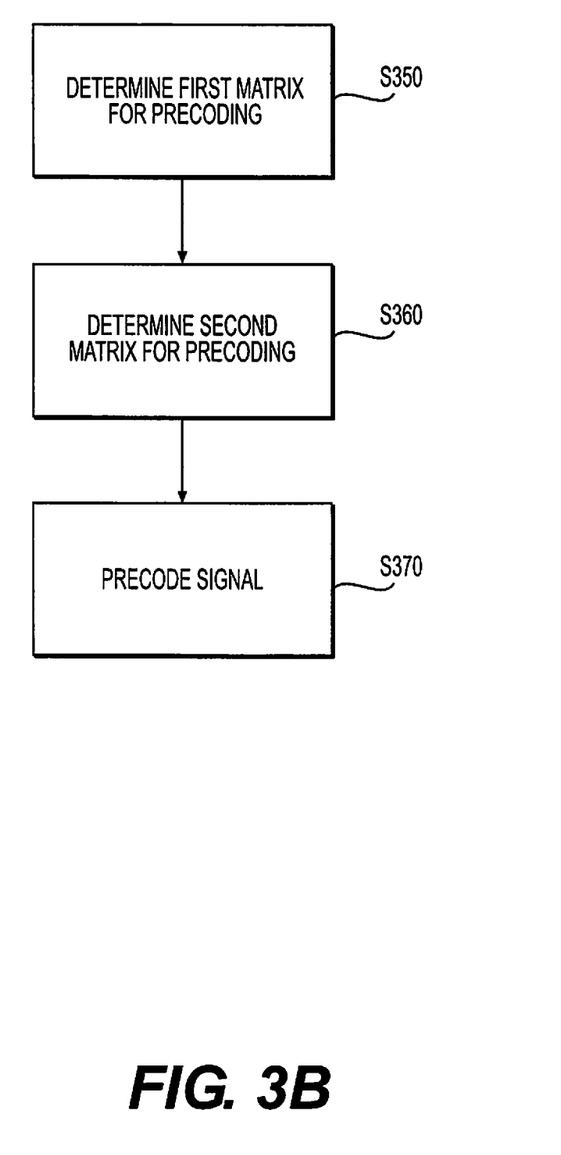
FIG. 3B illustrates a method of transmitting using sequential boosting on the downstream according to an example embodiment.

FIG. 3B illustrates a method of transmitting using sequential boosting on the downstream. The method of FIG. 3B may be performed by the access node 100. More specifically, the controller 130 may perform steps S350-S370.

At S350, the controller 130 determines a first matrix for precoding transmission from an access node to a plurality of downstream devices over a plurality of lines. The plurality of lines includes first lines and second lines. The first lines are associated with a higher vectoring performance than the second set of lines. The first matrix includes an identity matrix and a $|B|\times|B|$ inverse channel submatrix $G_{BB}^{-1}$, where $|B|$ is the number of first lines. The first matrix also includes $-G_{BB}^{-1}G_{BD}$ and $-G_{BB}^{-1}G_{BA}$ submatrices.

At S360, the controller 130 determines a second matrix for precoding the transmission. The second matrix includes normal operation interval (NOI) precoding coefficients associated with the first and second lines and an identity matrix. At S370, the controller 130 precodes a signal by sequentially applying the second matrix followed by the first matrix to the signal.

Upstream

While the above described embodiments are described with reference to determining precoder coefficients, it should be understood that similar methods may be applied to determine postcoder coefficients.

Figure 4:
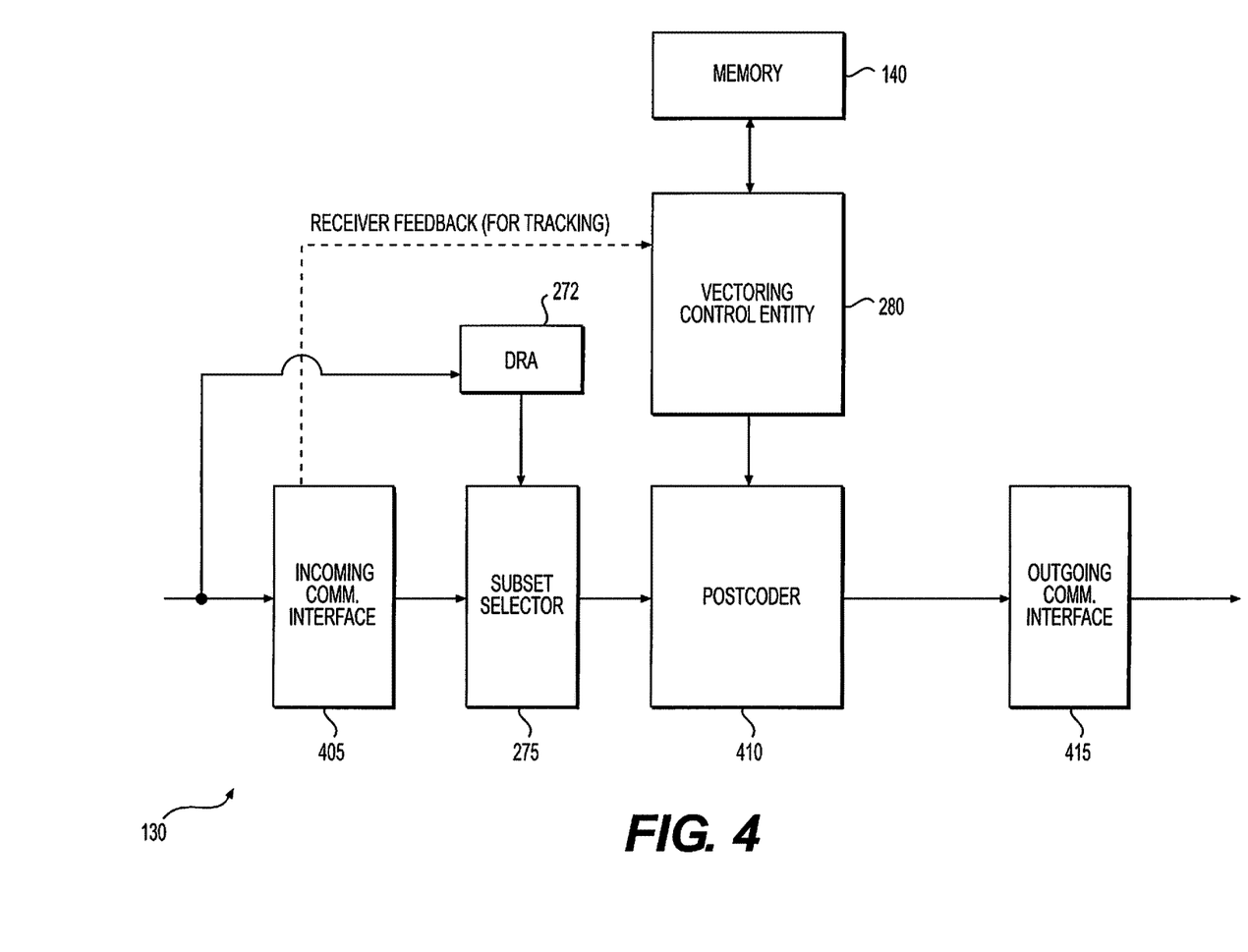
FIG. 4 illustrates a portion of the controller including a postcoder according to an example embodiment.

For example, FIG. 4 illustrates a portion of the controller 130 for processing upstream communications. As shown, the controller 130 has a communication interface 405 to receive symbol data from the CPEs 200-1-200-m. The communication interface 405 forwards the symbol data to a postcoder 410. The postcoder 410 applies a postcoder matrix to obtain post-coded symbol data. An outgoing communication interface 415 forwards the post-coded symbol data to the respective processing devices 125-1-125-m.

As described above, the VCE 280 is configured to store to and retrieve data from the memory (storage medium) 140, such as saved precoding/postcoding matrices.

Each of the communication interface 405 and the postcoder 410 may be implemented in hardware, a processor configured to execute software, firmware, or any combination thereof, for example. When at least one of the communication interface 405 and the postcoder 410 is hardware, such existing hardware may include one or more Central Processing Units (CPUs), digital signal processors (DSPs), application-specific-integrated-circuits (ASICs), field programmable gate arrays (FPGAs) or the like configured as special purpose machines to perform the functions of the at least one of the communication interface 405 and the postcoder 410. CPUs, DSPs, ASICs and FPGAs may generally be referred to as processors and/or microprocessors.

In the event where at least one of the communication interface 405 and the postcoder 410 is a processor executing software, the processor is configured as a special purpose machine to execute the software, stored in a storage medium (e.g., memory 140), to perform the functions of the at least one of the communication interface 405 and the postcoder 410. In such an embodiment, the processor may include one or more Central Processing Units (CPUs), digital signal processors (DSPs), application-specific-integrated-circuits (ASICs), field programmable gate arrays (FPGAs) computers.

Upstream—Block Boosting

Suppose the (normalized) channel is given by G (with the channel system model H=Gdiag(H), where diag(H) refers to a diagonal matrix containing the diagonal elements of H). For each subblock $A_k$, the full channel G and the postcoder $P_{Up}$ can be written as follows:

$$G = \begin{bmatrix} G_{DD} & G_{DA_k} & G_{DB} \\ G_{A_kD} & G_{A_kA_k} & G_{A_kB} \\ G_{BD} & G_{BA_k} & G_{BB} \end{bmatrix}$$

$$P_{Up} = \begin{bmatrix} P_{U_{P_{DD}}} & P_{U_{P_{DA_k}}} & P_{U_{P_{DB}}} \\ P_{U_{P_{A_kD}}} & P_{U_{P_{A_kA_k}}} & P_{U_{P_{A_kB}}} \\ P_{U_{P_{BD}}} & P_{U_{P_{BA_k}}} & P_{U_{P_{BB}}} \end{bmatrix},$$

where a zero-forcing postcoder satisfies:

$$P_{Up}G = I$$

The subscript "UP" is used to identify a matrix used to remove crosstalk on the upstream.

Moreover, while a zero-forcing postcoder is discussed, it should be understood that postcoders other than a zero-forcing postcoder may be used.

In an example embodiment, the controller 130 uses the following postcoder coefficients in DOI when the set of lines $\{A_k, B\}$ are active:

$$\begin{bmatrix} P_{U_{P_{A_kA_k}}} & P_{U_{P_{A_kB}}} \\ -(G_{BB} - G_{BA_k} G_{A_kA_k}^{-1} G_{A_kB})^{-1} G_{BA_k} G_{A_kA_k}^{-1} & (G_{BB} - G_{BA_k} G_{A_kA_k}^{-1} G_{A_kB})^{-1} \end{bmatrix},$$

The coefficients $P_{UpAkAk}$ and $P_{UpAkB}$ are used for vectoring the non-premium lines in the subblock $A_k$ and are the same coefficients used in NOI in the upstream. Therefore, the coefficients $P_{UpAkAk}$ and $P_{UpAkB}$ do not require any additional memory because they are already stored in the memory 140 for NOI in the upstream. Using the coefficients $P_{UpAkAk}$ and $P_{UpAkB}$ results in a partially vectored rate for lines in subblock $A_k$. The remaining coefficients $-(G_{BB}-G_{BA_k} G_{A_kA_k}^{-1} G_{A_kB})^{-1} G_{BA_k} G_{A_kA_k}^{-1}$ and $(G_{BB}-G_{BA_k} G_{A_kA_k}^{-1} G_{A_kB})^{-1}$ are specific to subblock $A_k$ and are computed by the controller 130 to ensure that the lines in the set of lines B achieve full SNR performance.

In the case of upstream, the coefficients $-(G_{BB}-G_{BA_k} G_{A_kA_k}^{-1} G_{A_kB})^{-1} G_{BA_k} G_{A_kA_k}^{-1}$ and $(G_{BB}-G_{BA_k} G_{A_kA_k}^{-1} G_{A_kB})^{-1}$ are corresponding rows of the ideal zero-forcing postcoder for the case that lines $\{A_k, B\}$ are active.

Using the combination $\{Ak,B\}$ during DOI results in a channel after postcoding as:

$$P_{Up}[k]G = \begin{bmatrix} 0 & 0 & 0 \\ 0 & P_{U_{P_{A_kA_k}}} & P_{U_{P_{A_kB}}} \\ 0 & \begin{matrix} -(G_{BB} - \\ G_{BA_k} G_{A_kA_k}^{-1} G_{A_kB})^{-1} \end{matrix} G_{BA} G_{A_kA_k}^{-1} & \begin{matrix} (G_{BB} - \\ G_{BA_k} G_{A_kA_k}^{-1} G_{A_kB})^{-1} \end{matrix} \end{bmatrix}$$

$$\begin{bmatrix} \begin{bmatrix} G_{DD} & G_{DA_k} & G_{DB} \\ G_{A_kD} & G_{A_kA_k} & G_{A_kB} \\ G_{BD} & G_{BA_k} & G_{BB} \end{bmatrix} \end{bmatrix} = \begin{bmatrix} 0 & 0 & 0 \\ X_{A_kD} & I + Y_{A_kA_k} & Y_{A_kB} \\ X_{BD} & 0 & I \end{bmatrix}$$

where $Y_{AkAk}$, $Y_{AkB}$ are matrix subblocks indicating second order crosstalk terms (e.g. terms generated from the product of off-diagonal crosstalk elements), while $X_{AD}$, $X_{BD}$ are subblocks indicating first order crosstalk terms, and $P_{Up}[k]$ is the matrix being used by the postcoder 410 when $\{B, A_k\}$ is active.

The first order crosstalk terms can be ignored by virtue of the fact that the discontinued lines D transmit no power. The second order terms $Y_{AA}$, $Y_{AB}$ cause the lines in $A_k$ to operate with "partially vectored" performance (better than non-vectored), with first crosstalk terms removed, but second-order terms remaining.

The following description illustrates how memory is saved. $P_{Up}[-1]$ is an NOI postcoder and $P_{Up}[k]$ is a postcoder in use when $\{B, A_k\}$ is active. $P_{Up}[0]$ is a postcoder in use when the subset B is active. Since $$P_{UpAkAk}[k] = P_{UpAkAk}[-1], \text{ and}$$

$$P_{UpAkB}[k] = P_{UpAkB}[-1],$$

the controller 130 and the memory 140 does not use any additional storage beyond $P_{Up}[-1]$ for the $P_{UpAkAk}[k]$ and $P_{UpAkB}[k]$ submatrices of $P_{Up}[k]$.

The controller 130 (e.g., the VCE 280) computes and stores $$P_{UpBA_k}[k] = -(G_{BB} - G_{BA_k} G_{A_kA_k}^{-1} G_{A_kB})^{-1} G_{BA_k} G_{A_kA_k}^{-1},$$

and $$P_{UpBB}[k] = (G_{BB} - G_{BA_k} G_{A_kA_k}^{-1} G_{A_kB})^{-1},$$

which are $|B| \times |A_k|$ and $|B| \times |B|$ matrices, respectively. By contrast, for block TDMA, the controller 130 would have to store the entire $(|B|+|A_k|) \times (|B|+|A_k|)$ matrix $P_{Up}[k]$.

The controller 130 may store the $|B| \times |B|$ matrix $$P_{UpBB}[0] = G_{BB}^{-1}$$

for when only the premium lines B are active.

In terms of matrix inversions, the controller 130 inverts a $|B| \times |B|$ matrix $G_{BB}-G_{BA_k} G_{A_kA_k}^{-1} G_{A_kB}$ and a $(|A_k|) \times (|A_k|)$ matrix $G_{A_kA_k}$. Sequentially, the VCE 280 computes $G_{A_kA_k}^{-1}$, then does matrix multiplications and subtraction to obtain $G_{BB}-G_{BA_k} G_{A_kA_k}^{-1} G_{A_kB}$. The VCE 280 then calculates $(G_{BB}-G_{BA_k} G_{A_kA_k}^{-1} G_{A_kB})^{-1}$.

In another example embodiment, the controller 130 uses the following postcoder coefficients in DOI when the set of lines $\{A_k, B\}$ are active:

$$\begin{bmatrix} P_{U_{P_{A_kA_k}}} & -P_{U_{P_{A_kA_k}}} G_{A_kB} G_{BB}^{-1} \\ P_{U_{P_{BA_k}}} & (I - P_{U_{P_{BA_k}}} G_{A_kB}) G_{BB}^{-1} \end{bmatrix},$$

The coefficients $P_{UpAkAk}$ and $P_{UpBAk}$ are used for reducing crosstalk from the non-premium lines in the subblock $A_k$ into non-premium and premium lines, respectively, and are the same coefficients used in NOI. Therefore, the coefficients $P_{UpAkAk}$ and $P_{UpBAk}$ do not require any additional memory because they are already stored in the memory 140 for NOI. Using the coefficients $P_{UpAkAk}$ and $P_{UpBAk}$ results in partially reduced crosstalk from lines in subblock $A_k$. The remaining coefficients $-P_{Up\ A_kA_k} G_{A_kB} G_{BB}^{-1}$ $(I-P_{Up\ BA_k} G_{A_kB}) G_{BB}^{-1}$ are specific to subblock $A_k$ and are computed by the controller 130 to ensure that the lines in the set of lines B do not generate any crosstalk among themselves or into the lines in $A_k$. In conjunction with power control on the lines in $A_k$, this can allow the lines in B to achieve full SNR performance. For power control, the controller 130 may communicate to the CPEs 200-1-200-m in the set $A_k$ a reduced transmit power level to use. The CPEs 200-1-200-m will then transmit at the reduced power level.

Using the combination $\{Ak,B\}$ during DOI results in a channel after postcoding as:

$$P_{Up}[k]G = \begin{bmatrix} 0 & 0 & 0 \\ 0 & P_{U_{P_{A_kA_k}}} & -P_{U_{P_{A_kA_k}}} G_{A_kB} G_{BB}^{-1} \\ 0 & P_{U_{P_{BA_k}}} & (I - P_{U_{P_{BA_k}}} G_{A_kB}) G_{BB}^{-1} \end{bmatrix}$$

$$\begin{bmatrix} \begin{bmatrix} G_{DD} & G_{DA_k} & G_{DB} \\ G_{A_kD} & G_{A_kA_k} & G_{A_kB} \\ G_{BD} & G_{BA_k} & G_{BB} \end{bmatrix} \end{bmatrix} = \begin{bmatrix} 0 & 0 & 0 \\ X_{A_kD} & I + Y_{A_kA_k} & 0 \\ X_{BD} & Y_{BA_k} & I \end{bmatrix}$$

where $Y_{AkAk}$, $Y_{BkAk}$ are matrix subblocks indicating second order crosstalk terms (e.g. terms generated from the product of off-diagonal crosstalk elements), and $X_{AkD}$, $X_{BD}$ are matrix subblocks indicating first order crosstalk terms. The first order crosstalk terms can be ignored by virtue of the fact that the discontinued lines D transmit no power. Moreover, the controller 130 may reduce the transmit power of the lines in $A_k$ until an interference caused to the premium lines by $Y_{BAk}$ is negligible (i.e., below the noise floor for lines in B).

In the upstream, this choice of subblock $\{A_k, B\}$ depends on the instantaneous traffic load requirements.

Only the rightmost subblocks $-P_{UP\ A_kA_k}G_{A_kB}G_{BB}^{-1}$ and $(I-P_{UP\ BA_k}G_{A_kB})G_{BB}^{-1}$ are additionally stored and computed for DOI (coefficients are also stored for NOI). The rightmost subblocks $-P_{UP\ A_kA_k}G_{A_kB}G_{BB}^{-1}$ and $(I-P_{UP\ BA_k}G_{A_kB})G_{BB}^{-1}$ correspond to a $(|B|+|A_k|)\times|B|$ matrix, whereas for block TDMA the same subblock would correspond to a $(|B|+|A_k|)\times(|B|+|A_k|)$ matrix to be stored. In terms of matrix inversions, the controller 130 computes a $|B|\times|B|$ matrix inverse $G_{BB}^{-1}$), versus $(|A_k|+|B|)\times(|A_k|+|B|)$ matrix inverses required for block TDMA.

This saves on memory and computational complexity while allowing premium service for a subset of lines and discontinuable operation for the remaining lines, based on the traffic load or on operator/system requirements (e.g., minimum data rates associated with the lines). In particular, the discontinued lines D can save on power consumption.

Figure 5A:
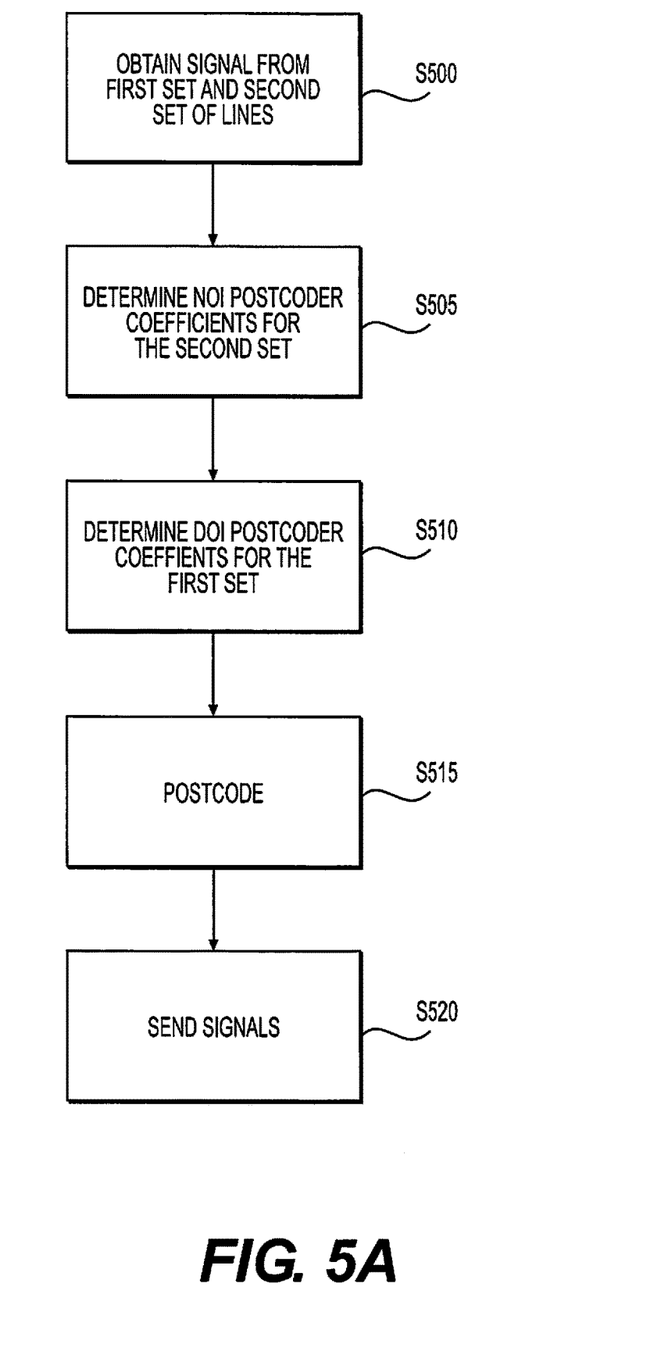
FIG. 5A illustrates a method of using block boosting on an upstream according to an example embodiment.

FIG. 5A illustrates a method of using block boosting on the upstream according to an example embodiment. The method of FIG. 5A may be performed by the access node 100. More specifically, the controller 130 may perform steps S300-S320.

At S500, the access node obtains a received signal vector over a first set of lines and a second set of lines. The first set of lines may be the set of lines B and the second set of lines may be the set of lines $A_k$.

At S505, the controller 130 obtains NOI postcoder coefficients for the second set of lines. For example, the controller 130 obtains the coefficients $P_{UpAkAk}$ and $P_{UpBAk}$ used in NOI for the upstream from the memory 140. In another example, the coefficients $P_{UpAkB}$ are obtained instead of the coefficients $P_{UpBAk}$.

At S510, the controller 130 determines DOI postcoder coefficients for the first set of lines. The DOI postcoder coefficients for the first set of lines and the NOI postcoder coefficients for the second set of lines form part of a postcoding matrix. Moreover, in an example embodiment, the controller 130 may communicate to the CPEs 200-1-200-$m$ in the set $A_k$ a reduced transmit power level to use. The CPEs 200-1-200-$m$ will then transmit at the reduced power level.

At S515, the controller 130 postcodes a received signal vector from the CPEs 200-1-200-$m$ to the processing devices 125-1-125-$m$ for a discontinuous operation interval using the postcoding matrix. At S520, the controller 130 sends the postcoded signal vector to the associated processing devices 125-1-125-$m$. More specifically, the received signal vector comes from 125-1-125-$m$ and then the postcoded signal vector is sent back to 125-1-125-$m$. The signals originally came from the CPEs, came through the cable, through analog-to-digital circuits (ADC) (line-drivers 135-1-135-$m$) and into the processing units 125-1-125-$m$.

Upstream—Sequential Boosting

As an alternative to block boosting in the upstream, the controller 130 may implement sequential boosting for the upstream (postcoder), in at least some example embodiments.

When using sequential boosting for the upstream, the controller 130 sequentially applies two sparse matrices as follows:

$$\begin{bmatrix} 0 & 0 & 0 \\ 0 & P_{U_{PAA}} & 0 \\ 0 & P_{U_{PBA}} & I \end{bmatrix} \begin{bmatrix} 0 & 0 & -G_{DB}G_{BB}^{-1} \\ 0 & I & -G_{AB}G_{BB}^{-1} \\ 0 & 0 & G_{BB}^{-1} \end{bmatrix},$$

The controller 130 does not identify subblocks $A_k$ in advance, but any lines outside the premium set of lines can discontinue at all moments, and constitute the non-premium lines A. The computations performed by the controller 130 are sequential, meaning that the results of the first matrix multiplication (the matrix with the G and G–1 terms) must be calculated and available before beginning the second matrix multiplication (matrix with the $P_{Up}$ terms). To get full performance on the premium lines B, the transmit power is also reduced for the lines in A.

Figure 5B:
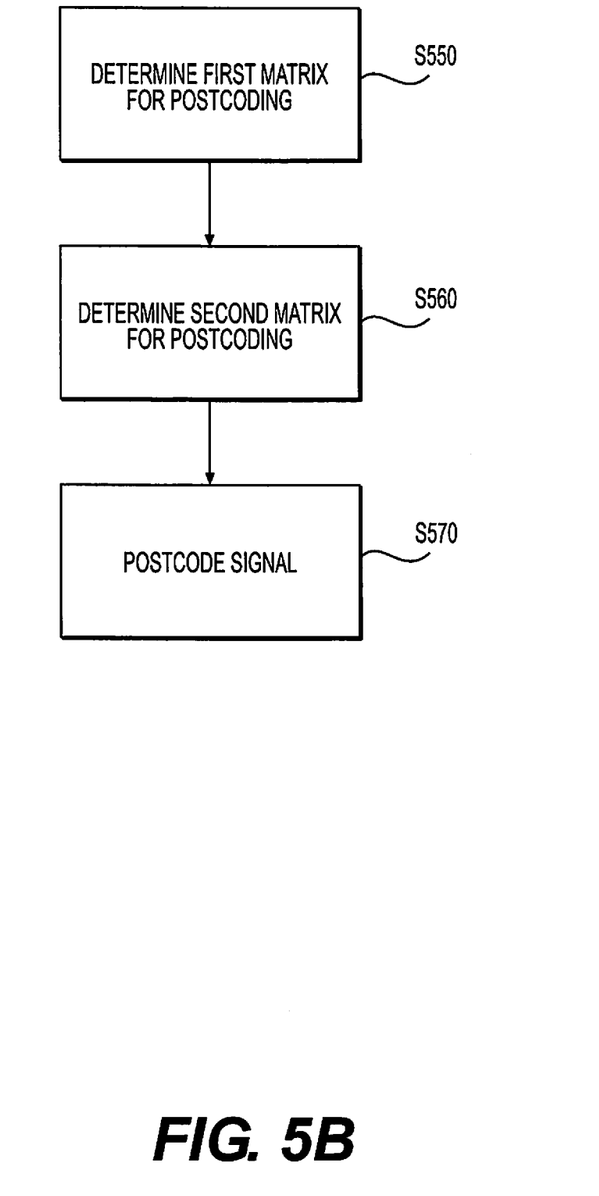
FIG. 5B illustrates a method of using sequential boosting on the upstream according to an example embodiment.

FIG. 5B illustrates a method of using sequential boosting on the upstream according to an example embodiment. The method of FIG. 5B may be performed by the access node 100. More specifically, the controller 130 may perform steps S550-S570.

At S550, the controller 130 determines a first matrix for precoding transmission from an access node to a plurality of downstream devices over a plurality of lines. The plurality of lines includes first lines and second lines. The first lines are associated with a higher vectoring performance than the second set of lines. For example, the first lines may be the set of lines B and the second lines may be the set of lines $A_k$. The first matrix includes an identity matrix and a $|B|\times|B|$ inverse channel submatrix $G_{BB}^{-1}$ where $|B|$ is the number of first lines. The first matrix also includes $-G_{DB}G_{BB}^{-1}$ and $-G_{AB}G_{BB}^{-1}$ submatrices.

At S560, the controller 130 determines a second matrix for precoding the transmission. The second matrix includes normal operation interval (NOI) postcoding coefficients (e.g., $P_{UpAA}$ and $P_{UpBA}$) associated with the first and second lines and an identity matrix. At S570, the controller 130 postcodes a signal by sequentially applying the first matrix followed by the second matrix to the signal vector. Moreover, in an example embodiment, the controller 130 may determine a reduced transmit power level to use for the lines in the set $A_k$. The CPEs 200-1-200-$m$ will then transmit at the reduced power level.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:
1. A method comprising:
  determining a first set of lines and a second set of lines in a system;
  receiving signals from the first set of lines and the second set of lines;
  obtaining normal operation interval (NOI) vectoring coefficients for the second set of lines;
  determining discontinuous operation interval (DOI) vectoring coefficients for the first set of lines, the DOI vectoring coefficients for the first set of lines and the NOI vectoring coefficients for the second set of lines being part of a vectoring matrix; and jointly processing the signals for a discontinuous operation interval using the vectoring matrix.

2. The method of claim 1, wherein the first set of lines is associated with a higher vectoring performance than the second set of lines.

3. The method of claim 1, wherein the determining determines the first and second sets of lines based on at least one of a traffic load of the system and static data rate values associated with the lines in the first and second sets of lines, respectively.

4. The method of claim 1, wherein the NOI vectoring coefficients and the DOI vectoring coefficients are postcoder coefficients and the vectoring matrix is a postcoding matrix.

5. The method of claim 4, wherein the postcoding matrix includes a (|B|+|A|)×|B| submatrix for the discontinuous operation interval, where |B| is a number of the first set of lines corresponding to the DOI postcoder coefficients and |A| is a number of the second set of lines corresponding to the NOI postcoder coefficients.

6. The method of claim 5, further comprising:
storing the (|B|+|A|)×|B| submatrix in a memory storage medium.

7. An access node comprising:
a memory storage medium including computer-readable instructions; and
a processor configured to execute the computer-readable instructions to cause the access node to,
determine a first set of lines and a second set of lines in a system;
receive signals from, the first set of lines and the second set of lines;
obtain normal operation interval (NOI) vectoring coefficients for the second set of lines;
determine discontinuous operation interval (DOI) vectoring coefficients for the first set of lines, the DOI vectoring coefficients for the first set of lines and the NOI vectoring coefficients for the second set of lines being part of a vectoring matrix; and
jointly process the signals for a discontinuous operation interval using the vectoring matrix.

8. The access node of claim 7, wherein the first set of lines is associated with a higher vectoring performance than the second set of lines.

9. The access node of claim 7, wherein the processor is configured to execute the computer-readable instructions to cause the access node to determine the first and second sets of lines based on at least one of a traffic load of the system and static data rate values associated with the lines in the first and second sets of lines, respectively.

10. The access node of claim 7, wherein the NOI vectoring coefficients and the DOI vectoring coefficients are postcoder coefficients and the vectoring matrix is a postcoding matrix.

11. The access node of claim 10, wherein the postcoding matrix includes a (|B|+|A|)×|B| submatrix for the discontinuous operation interval, where |B| is a number of the first set of lines corresponding to the DOI postcoder coefficients and |A| is a number of the second set of lines corresponding to the NOI postcoder coefficients.

12. The access node of claim 11, the processor is configured to execute the computer-readable instructions to cause the access node to store the (|B|+|A|)×|B| submatrix in the memory storage medium.

13. A method comprising:
determining a first set of lines and a second set of lines in a system;
obtaining signals to be transmitted over the first set of lines and the second set of lines;
obtaining normal operation interval (NOI) vectoring coefficients for the second set of lines;
determining discontinuous operation interval (DOI) vectoring coefficients for the first set of lines, the DOI vectoring coefficients for the first set of lines and the NOI vectoring coefficients for the second set of lines being part of a vectoring matrix;
jointly processing the signals for a discontinuous operation interval using the vectoring matrix; and
transmitting the jointly processed signals.

14. The method of claim 13, wherein the vectoring matrix includes a |B|×(|B|+|A|) submatrix for the discontinuous operation interval, where |B| is a number of the first set of lines corresponding to the DOI vectoring coefficients and |A| is a number of the second set of lines corresponding to the NOI vectoring coefficients.

15. The method of claim 14, further comprising:
storing the |B|×(|B|+|A|) submatrix in a memory storage medium.

16. The method of claim 13, wherein the first set of lines is associated with a higher vectoring performance than the second set of lines.

17. The method of claim 13, wherein the determining determines the first and second sets of lines based on at least one of a traffic load of the system and static data rate values associated with the lines in the first and second sets of lines, respectively.

18. An access node comprising:
a memory storage medium including computer-readable instructions; and
a processor configured to execute the computer-readable instructions to cause the access node to,
determine a first set of lines and a second set of lines in a system;
obtain signals to be transmitted over, or received from, the first set of lines and the second set of lines;
obtain normal operation interval (NOI) vectoring coefficients for the second set of lines;
determine discontinuous operation interval (DOI) vectoring coefficients for the first set of lines, the DOI vectoring coefficients for the first set of lines and the NOI vectoring coefficients for the second set of lines being part of a vectoring matrix;
jointly process the signals for a discontinuous operation interval using the vectoring matrix; and
transmit the jointly processed signals.

19. The access node of claim 18, wherein the vectoring matrix includes a |B|×(|B|+|A|) submatrix for the discontinuous operation interval, where |B| is a number of the first set of lines corresponding to the DOI vectoring coefficients and |A| is a number of the second set of lines corresponding to the NOI vectoring coefficients.

20. The access node of claim 19, wherein the processor is configured to execute the computer-readable instructions to cause the access node to store the |B|×(|B|+|A|) submatrix in the memory storage medium.

21. The access node of claim 18, wherein the first set of lines is associated with a higher vectoring performance than the second set of lines.

22. The access node of claim 18, wherein the processor is configured to execute the computer-readable instructions to cause the access node to determine the first and second sets of lines based on at least one of a traffic load of the system and static data rate values associated with the lines in the first and second sets of lines, respectively.

23. The access node of claim 18, wherein the NOI vectoring coefficients and the DOI vectoring coefficients are precoder coefficients and the vectoring matrix is a precoding matrix.

* * * * *